United States Patent
Sakai et al.

(10) Patent No.: US 9,761,871 B2
(45) Date of Patent: Sep. 12, 2017

(54) NEGATIVE ELECTRODE FOR SODIUM MOLTEN SALT BATTERY, METHOD FOR PRODUCING SAME, AND SODIUM MOLTEN SALT BATTERY

(71) Applicant: Sumitomo Electric Industries, Ltd., Osaka-shi (JP)

(72) Inventors: Shoichiro Sakai, Osaka (JP); Atsushi Fukunaga, Osaka (JP); Koma Numata, Osaka (JP); Eiko Imazaki, Osaka (JP); Koji Nitta, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/906,872

(22) PCT Filed: May 23, 2014

(86) PCT No.: PCT/JP2014/063687
§ 371 (c)(1),
(2) Date: Jan. 21, 2016

(87) PCT Pub. No.: WO2015/011978
PCT Pub. Date: Jan. 29, 2015

(65) Prior Publication Data
US 2016/0156029 A1   Jun. 2, 2016

(30) Foreign Application Priority Data

Jul. 26, 2013  (JP) ................................. 2013-155665

(51) Int. Cl.
*H01M 10/39* (2006.01)
*H01M 4/24* (2006.01)
(Continued)

(52) U.S. Cl.
CPC ......... *H01M 4/366* (2013.01); *H01M 4/0404* (2013.01); *H01M 4/0454* (2013.01);
(Continued)

(58) Field of Classification Search
CPC .. H01M 4/366; H01M 4/0454; H01M 4/0404; H01M 4/133; H01M 4/1393;
(Continued)

(56) References Cited

U.S. PATENT DOCUMENTS

2006/0154147 A1   7/2006 Kurihara et al.
2014/0287302 A1   9/2014 Fukunaga et al.

FOREIGN PATENT DOCUMENTS

CN          1816927 A      8/2006
JP       2011-192474 A     9/2011
(Continued)

OTHER PUBLICATIONS

Ogawa et al., "Sodium Intercalation behavior of carbon electrodes in elecytrolytes containing Ionic liquid", Abstracts, Battery Symposium in Japan, Nov. 13, 2012, p. 295.
(Continued)

*Primary Examiner* — Cynthia K Walls
(74) *Attorney, Agent, or Firm* — Venable LLP; Michael A. Santori

(57) ABSTRACT

An aspect of the present invention relates to a negative electrode for a sodium molten salt battery, the negative electrode including a negative electrode current collector and a negative electrode mixture layer arranged on a surface of the negative electrode current collector, the negative electrode mixture layer including negative electrode active material particles and a film arranged on a surface of each of the negative electrode active material particles, the negative electrode active material particles containing hard carbon, and the film containing a sodium-containing sulfide.

5 Claims, 1 Drawing Sheet

(51) Int. Cl.
  *H01M 4/36* (2006.01)
  *H01M 4/04* (2006.01)
  *H01M 4/133* (2010.01)
  *H01M 4/1393* (2010.01)
  *H01M 4/587* (2010.01)
  *H01M 4/62* (2006.01)
  *H01M 10/42* (2006.01)
  *H01M 4/02* (2006.01)

(52) U.S. Cl.
  CPC ......... *H01M 4/133* (2013.01); *H01M 4/1393* (2013.01); *H01M 4/587* (2013.01); *H01M 4/628* (2013.01); *H01M 10/399* (2013.01); *H01M 10/4235* (2013.01); *H01M 2004/027* (2013.01)

(58) Field of Classification Search
  CPC ............... H01M 4/628; H01M 10/399; H01M 10/4235; H01M 4/587; H01M 2004/027
  See application file for complete search history.

(56) References Cited

FOREIGN PATENT DOCUMENTS

| | | |
|---|---|---|
| JP | 2013-062121 A | 4/2013 |
| WO | WO-2011/148864 A1 | 12/2011 |

OTHER PUBLICATIONS

International Search Report in International Application No. PCT/JP2014/063687, dated Aug. 19, 2014.

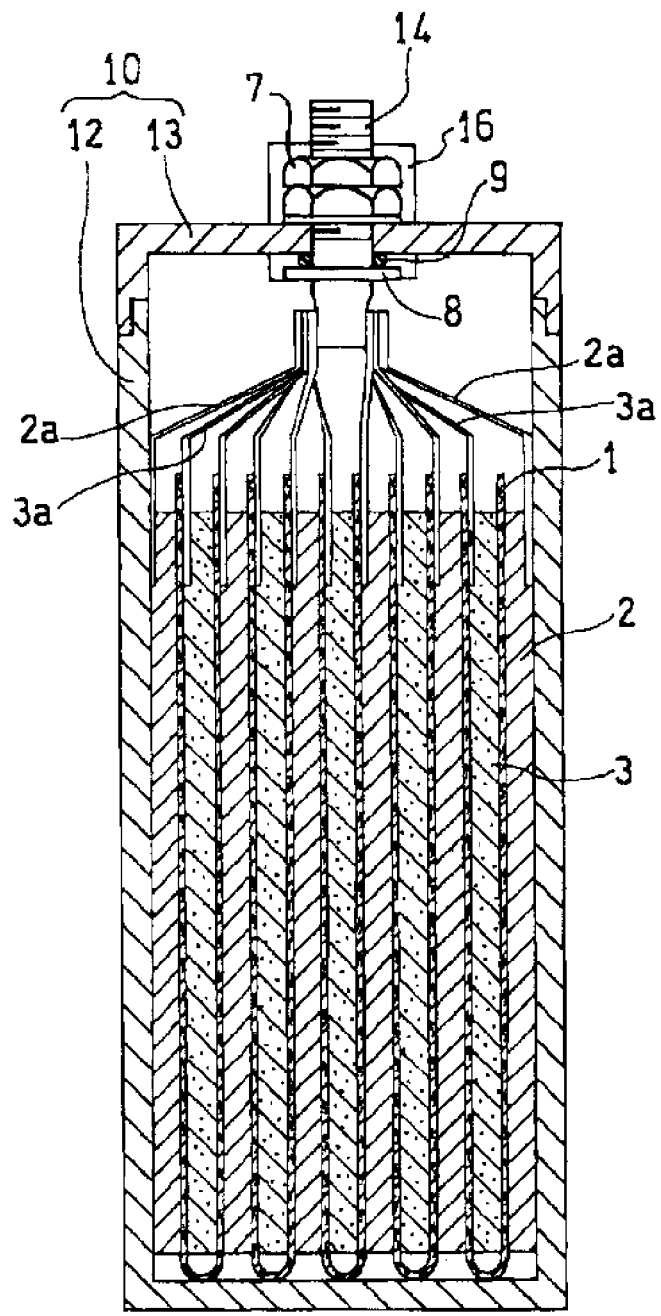

NEGATIVE ELECTRODE FOR SODIUM MOLTEN SALT BATTERY, METHOD FOR PRODUCING SAME, AND SODIUM MOLTEN SALT BATTERY

TECHNICAL FIELD

The present invention relates to a negative electrode for a sodium molten salt battery, a method for producing a negative electrode for a sodium molten salt battery, and a sodium molten salt battery.

BACKGROUND ART

In recent years, techniques for converting natural energy, such as sunlight and wind power, into electrical energy have been receiving attention. There has been increasing demand for nonaqueous electrolyte secondary batteries as high-energy-density batteries capable of storing a large amount of electrical energy. Among nonaqueous electrolyte secondary batteries, lithium-ion secondary batteries have the advantage of being light in weight and having high electromotive forces. Lithium-ion secondary batteries, however, have disadvantages that the heat resistance is low and electrolytes are easily decomposed on surfaces of electrodes (or particle surfaces of electrode active materials) because of the use of organic electrolytic solutions containing organic solvents. The price of lithium resources is rising in association with the expansion of the market for nonaqueous electrolyte secondary batteries.

There have been advances in the development of molten salt batteries including flame-retardant molten salts serving as electrolytes. Molten salts have excellent thermal stability, relatively easily ensure safety, and are also suited for continuous use at high temperatures. A molten salt battery can include a molten salt which contains cations of an inexpensive alkali metal (in particular, sodium) other than lithium and which is used as an electrolyte, so that the production cost is low.

Although electrolytes containing molten salts (molten salt electrolytes) have higher thermal stability than that of organic electrolytic solutions, many of them are solid. Thus, the operating temperatures of batteries are liable to be high. For example, a salt (NaFSA) of a sodium ion and a bis(fluorosulfonyl)amide anion (FSA$^-$: bis(fluorosulfonyl)amide anion), which is used as a molten salt electrolyte in a sodium molten salt battery, has a melting point of 106° C. Thus, in the case where NaFSA is used as a molten salt electrolyte alone, the operating temperature of a battery needs to be a temperature equal to or higher than the melting point of NaFSA.

To reduce the operating temperature of a molten salt battery, it has been reported that a salt (KFSA) of a potassium ion and FSA$^-$ is added to NaFSA and that an organic cation, for example, a 1-ethyl-3-methylimidazolium cation (EMI$^+$) or a 1-ethyl-1-methylpyrrolidinium cation, is added to NaFSA (Patent Literature 1).

CITATION LIST

Patent Literature

PTL 1: Japanese Unexamined Patent Application Publication No. 2011-192474

SUMMARY OF INVENTION

Technical Problem

In batteries, the decomposition of electrolytes on electrode surfaces results in the generation of gases or the formation of by-products, thereby degrading cycle characteristics. Thus, in nonaqueous electrolyte secondary batteries including organic electrolytic solutions, the decomposition of organic electrolytic solutions on electrodes is inhibited by the addition of additives, such as fluoroethylene carbonate, to organic electrolytic solutions. This inhibits degradation in cycle characteristics.

Molten salt electrolytes have high heat resistance and are less likely to be decomposed on electrode surfaces, compared with organic electrolytic solutions. In some cases, however, molten salt electrolytes are disadvantageously decomposed on electrode surfaces, thereby degrading cycle characteristics. In sodium molten salt batteries, metallic sodium may be deposited on surfaces of negative electrodes. Metallic sodium has very high activity; hence, side reactions leading to decomposition of molten salt electrolytes may occur. However, in molten salt batteries, substantially no study has been conducted on means for inhibiting the decomposition of electrolytes on electrode surfaces. Unlike organic electrolytic solutions, operating temperatures of such batteries are high. This restricts types of additives used to inhibit the decomposition of molten salt electrolytes on electrode surfaces. That is, it is difficult to directly use means for inhibiting the decomposition of organic electrolytic solutions on electrode surfaces in nonaqueous electrolyte secondary batteries including organic electrolytic solutions, for molten salt batteries.

To reduce operating temperatures of molten salt batteries, organic cation-containing molten salt electrolytes have recently been used, in some cases, as described in Patent Literature 1. The use of organic cations in molten salt electrolytes enables operating temperatures of molten salt batteries to be, for example, about 20° C. to 70° C. However, organic cations have lower heat resistance than those of inorganic cations, such as sodium ions and potassium ions, and are liable to be decomposed on a surface of a negative electrode. Thus, the use of organic cation-containing molten salt electrolytes is liable to lead to degradation in cycle characteristics.

There is provided a negative electrode for a sodium molten salt battery capable of inhibiting the decomposition of a molten salt electrolyte on a surface of a negative electrode (or surfaces of negative electrode active material particles) and capable of inhibiting degradation in cycle characteristics, a method for producing the negative electrode, and a sodium molten salt battery.

Solution to Problem

An aspect of the present invention relates to a negative electrode for a sodium molten salt battery, the negative electrode including a negative electrode current collector and a negative electrode mixture layer arranged on a surface of the negative electrode current collector, the negative electrode mixture layer including negative electrode active material particles and a film arranged on a surface of each of the negative electrode active material particles, the negative electrode active material particles containing hard carbon, and the film containing a sodium-containing sulfide.

Another aspect of the present invention relates to a method for producing a negative electrode for a sodium molten salt battery, the method including a step A of forming a negative electrode mixture layer including negative electrode active material particles containing hard carbon on a surface of a negative electrode current collector; and a step of B of maintaining the negative electrode mixture layer formed on the surface of the negative electrode current collector in a molten salt electrolyte containing at least a first salt of a sodium ion serving as a first cation and a bis (sulfonyl)amide anion at 20° C. to 120° C. and a potential of 0.1 to 0.5 V for 10 to 60 minutes with respect to metallic sodium to form a film containing sodium sulfide on the surface of each of the negative electrode active material particles.

Still another aspect of the present invention relates to a sodium molten salt battery including a positive electrode, the foregoing negative electrode, a separator arranged between the positive electrode and the negative electrode, and a molten salt electrolyte having sodium ion conductivity.

Advantageous Effects of Invention

According to the foregoing aspects of the present invention, provided are a negative electrode for a sodium molten salt battery capable of inhibiting the decomposition of a molten salt electrolyte on a surface of a negative electrode (or particle surfaces of a negative electrode active material) and capable of inhibiting degradation in cycle characteristics, a method for producing the negative electrode, and a sodium molten salt battery.

BRIEF DESCRIPTION OF DRAWINGS

FIG. 1 is a longitudinal sectional view schematically illustrating a sodium molten salt battery according to an embodiment of the present invention.

DESCRIPTION OF EMBODIMENTS

Description of Embodiments of Invention

First, embodiments of the present invention will be listed and described below.

An embodiment of the present invention relates to (1) a negative electrode for a sodium molten salt battery, the negative electrode including a negative electrode current collector and a negative electrode mixture layer arranged on a surface of the negative electrode current collector, the negative electrode mixture layer including negative electrode active material particles and a film arranged on a surface of each of the negative electrode active material particles, the negative electrode active material particles containing hard carbon, and the film containing a sodium-containing sulfide. The arrangement of the film containing sodium sulfide on the surface of each of the negative electrode active material particles inhibits the decomposition of the molten salt electrolyte on the surface of the negative electrode active material particles or a surface of the negative electrode. Since the decomposition of the molten salt electrolyte is inhibited, charge and discharge can be stably repeated, thereby inhibiting degradation in cycle characteristics. The film seemingly serves as what is called a solid electrolyte interface (SEI).

The molten salt battery used here indicates a generic name of a battery containing a molten salt (a salt in a molten state (ionic liquid)) that serves as an electrolyte. The molten salt electrolyte indicates an electrolyte containing a molten salt. The sodium molten salt battery indicates a battery which includes a molten salt exhibiting sodium ion conductivity as an electrolyte and in which sodium ions serve as charge carriers participating in a charge-discharge reaction. The ionic liquid indicates a liquid consisting of an anion and a cation.

(2) The film preferably has an average thickness of 10 to 500 nm. In the case where the film has an average thickness as described above, the effect of inhibiting the decomposition of the molten salt electrolyte is high, and an increase in the resistance of the negative electrode is inhibited.

(3) The hard carbon preferably contains sulfur. The negative electrode mixture layer preferably has a sulfur content of 0.05% by mass or more. The incorporation of sulfur in the hard carbon is more likely to lead to the formation of the film containing sodium sulfide. The sulfur content of the negative electrode mixture layer is easily increased, thereby easily inhibiting the decomposition of the molten salt electrolyte.

(4) The hard carbon preferably contains a mercapto group. The mercapto group may be introduced into the hard carbon by, for example, bringing the hard carbon into contact with hydrogen sulfide. In the case where the mercapto group is introduced into the hard carbon, the mercapto group may be left in the hard carbon even after the film containing sodium sulfide is formed on each of the negative electrode active material particles. That is, in the case where the hard carbon with a sufficient content of mercapto groups is used, the stable film is easily formed on the surface of each of the negative electrode active material particles.

(5) Another aspect of the present invention relates to a method for producing a negative electrode for a sodium molten salt battery, the method including a step A of forming a negative electrode mixture layer including negative electrode active material particles containing hard carbon on a surface of a negative electrode current collector; and a step of B of maintaining the negative electrode mixture layer formed on the surface of the negative electrode current collector in a molten salt electrolyte containing at least a first salt of a sodium ion serving as a first cation and a bis (sulfonyl)amide anion (first anion) at 20° C. to 120° C. and a potential of 0.1 to 0.5 V for 10 to 60 minutes with respect to metallic sodium to form a film containing sodium sulfide on the surface of each of the negative electrode active material particles. By maintaining the negative electrode mixture layer in the molten salt electrolyte under the foregoing conditions, the film containing sodium sulfide is easily formed on the surface of each of the negative electrode active material particles. The formation of the film inhibits the decomposition of the molten salt electrolyte on the surface of each of the negative electrode active material particles or the negative electrode, thereby inhibiting degradation in the cycle characteristics of the sodium molten salt battery.

(6) In a preferred embodiment, the molten salt electrolyte further contains a second salt of a second cation other than the sodium ion and a bis(sulfonyl)amide anion (second anion). In the case where the molten salt electrolyte contains the first salt and the second salt, the molten salt electrolyte has a low melting point, thereby easily forming a stable film.

(7) The second cation is preferably an organic cation. The use of the molten salt electrolyte containing the organic cation also enables the operating temperature of the molten salt battery to decrease (for example, about 20° C. to about 70° C.). The organic cation has low heat resistance and is liable to be decomposed on the surface of the negative electrode, compared with inorganic cations, such as a sodium ion and a potassium ion. Thus, the use of an organic cation-containing molten salt electrolyte is liable to lead to degradation in cycle characteristics. However, since the film containing sodium sulfide is formed on the surface of each of the negative electrode active material particles, also in the case where the organic cation-containing molten salt electrolyte is used, the decomposition of the molten salt electrolyte is inhibited.

(8) Preferably, the molten salt electrolyte further contains an alkanesulfonic acid. (9) The alkanesulfonic acid preferably contains methanesulfonic acid. In the case where the molten salt electrolyte contains an alkanesulfonic acid, such as methanesulfonic acid, the sodium sulfide-containing film is more easily formed.

(10) The molten salt electrolyte preferably has an alkanesulfonic acid content of 0.5% to 10% by mass. In the case where the alkanesulfonic acid content is within the range described above, an appropriate film is easily formed on the surface of each of the negative electrode active material particles. It is thus possible to more effectively inhibit the decomposition of the molten salt electrolyte on the surface of each of the negative electrode active material particles or the surface of the negative electrode while an increase in the electrical resistance of the surface of the negative electrode is inhibited.

(11) In a preferred embodiment, the step A includes a substep a1 of bringing the hard carbon into contact with hydrogen sulfide to introduce a mercapto group into the hard carbon. In this embodiment, the sodium sulfide-containing film is more easily formed on the surface of each of the negative electrode active material particles.

(12) In a preferred embodiment, before the step B, the method may include a step C of bringing the negative electrode mixture layer into contact with hydrogen sulfide to introduce a mercapto group into the hard carbon. Also in this embodiment, the sodium sulfide-containing film is more easily formed on the surface of each of the negative electrode active material particles.

(13) A still another embodiment of the present invention relates to a sodium molten salt battery including a positive electrode, the negative electrode described in (1), a separator arranged between the positive electrode and the negative electrode, and a molten salt electrolyte having sodium ion conductivity. In the sodium molten salt battery, the sodium sulfide-containing film is formed on the surface of each of the negative electrode active material particles. This inhibits the decomposition of the molten salt electrolyte on the surface of each of the negative electrode active material particles or the surface of the negative electrode, thereby inhibiting degradation in cycle characteristics.

Details of Embodiments of Invention

Specific examples of molten salt batteries according to embodiments of the present invention will be described below with appropriate reference to the drawings. The present invention is not limited to these examples. The present invention is indicated by the appended claims. It is intended to include any modifications within the scope and meaning equivalent to the scope of the claims.

(Negative Electrode)

A negative electrode for a sodium molten salt battery according to an embodiment of the present invention includes a negative electrode current collector and a negative electrode mixture layer arranged on a surface of the negative electrode current collector.

As the current collector, metal foil, a nonwoven fabric composed of metal fibers, a porous metal sheet, or the like is used.

Examples of a metal preferably contained in the negative electrode current collector include, but are not limited to, copper, copper alloys, nickel, nickel alloys, aluminum, and aluminum alloys because they are not alloyed with sodium and are stable at a negative electrode potential.

The metal foil used for the current collector has a thickness of, for example, 10 to 50 µm. Each of the nonwoven fabric composed of metal fibers and the porous metal sheet has a thickness of, for example, 100 to 1000 µm.

The negative electrode mixture layer includes negative electrode active material particles and a film arranged on a surface of each of the negative electrode active material particles.

Each of the negative electrode active material particles contains hard carbon. The film contains sodium sulfide. The negative electrode mixture layer may contain a binder, a conductive assistant, and so forth as optional components. The negative electrode mixture layer may be arranged on one or both of the surfaces of the negative electrode current collector.

Unlike graphite, which has a graphite crystal structure in which carbon layer planes are stacked in layers, hard carbon, serving as a negative electrode active material, has a turbostratic structure in which carbon layer planes are stacked in a state of being three-dimensionally displaced. The heat treatment of hard carbon even at a high temperature (e.g., 3000° C.) does not result in a transformation from the turbostratic structure to the graphitic structure or the development of graphite crystallites. Thus, hard carbon is also referred to as non-graphitizable carbon.

The average interplanar spacing $d_{002}$ of the (002) planes of a carbonaceous material measured from an X-ray diffraction (XRD) spectrum is used as an index to the degree of development of a graphite crystal structure of the carbonaceous material. The carbonaceous material categorized into graphite typically has a small average interplanar spacing $d_{002}$ less than 0.337 nm. In contrast, the hard carbon with the turbostratic structure has a large average interplanar spacing $d_{002}$ of, for example, 0.37 nm or more and preferably 0.38 nm or more. The upper limit of the average interplanar spacing $d_{002}$ of the hard carbon is not particularly limited. The average interplanar spacing $d_{002}$ may be, for example, 0.42 nm or less. The hard carbon may have an average interplanar spacing $d_{002}$ of, for example, 0.37 to 0.42 nm and preferably 0.38 to 0.4 nm.

In lithium-ion batteries, graphite is used for negative electrodes. Lithium ions are intercalated into interlayer portions of the graphite crystal structure in graphite (specifically, the layered structure of carbon layer planes (what is called a graphene structure)). The hard carbon has the turbostratic structure. The proportion of the graphite crystal structure in the hard carbon is small. In the case where sodium ions are occluded in the hard carbon, sodium ions enter the turbostratic structure of the hard carbon (specifically, portions other than interlayer portions of the graphite crystal structure) and are adsorbed on the hard carbon, so that sodium ions are occluded in the hard carbon. Regarding an active material having a developed graphite crystal structure, many sodium ions are intercalated into and deintercalated from the interlayer portions of the layered structure during charging and discharging to cause a large change in the volume of the active material due to charging and discharging. Thus the repetition of charging and discharging significantly degrades the active material.

In lithium-ion secondary batteries, many lithium ions are intercalated into and deintercalated from interlayer portions of the layered structure of graphite during charging and discharging. In addition, the proportion of a layered structure is large. Thus, a change in the volume of an active material due to charging and discharging is large. The repetition of charging and discharging significantly degrades the active material. In sodium molten salt batteries, sodium ions are inserted into portions other than interlayer portions of the graphite crystal structure (for example, voids formed in the turbostratic structure) and adsorbed. In this way, sodium ions are occluded in the hard carbon. Thus, in the case of the hard carbon, a stress caused by the insertion and release of sodium ions is relieved to reduce a change in volume, thus inhibiting the degradation even if the charging and discharging are repeated.

Regarding the structure of hard carbon, various models have been reported. It is considered that in the turbostratic structure, carbon layer planes are stacked in a state of being three-dimensionally displaced to form voids as described above. Thus, the hard carbon has a low average specific gravity, compared with graphite having a crystal structure in which carbon layer planes are densely stacked in layers. Graphite has an average specific gravity of about 2.1 to about 2.25 g/cm$^3$. The hard carbon has an average specific gravity of, for example, 1.7 g/cm$^3$ or less and preferably 1.4 to 1.7 g/cm$^3$ or 1.5 to 1.7 g/cm$^3$. The average specific gravity of the hard carbon leads to only a small change in volume due to the occlusion and release of sodium ions during charging and discharging, thus effectively inhibiting the degradation of the active material.

The hard carbon contains a carbonaceous material obtained by, for example, carbonization of a raw material in a solid state. The raw material subjected to carbonization in the solid state is a solid organic substance. Specific examples thereof include saccharides and resins (thermosetting resins, such as phenolic resins, and thermoplastic resins, such as polyvinylidene chloride). Examples of saccharides include saccharides having relatively short carbohydrate chains (monosaccharides, such as sucrose); and polysaccharides, such as cellulose [for example, cellulose and derivatives thereof (cellulose esters, cellulose ethers, and so forth), and cellulose-containing materials, such as wood and fruit shells (coconut shells and so forth)]. Glassy carbon is also included in the hard carbon. A single type of hard carbon may be used alone. Two or more types of hard carbon may be used in combination.

The negative electrode active material is not particularly limited as long as it contains the hard carbon. The negative electrode active material may contain a material which is other than the hard carbon and which reversibly occludes and release sodium ions. The negative electrode active material has a hard carbon content of, for example, 90% by mass or more and preferably 95% by mass or more. It is also preferable to use the hard carbon alone as the negative electrode active material.

The negative electrode active material particles (for example, hard carbon particles) may have an average particle size (a particle size at a cumulative volume of 50% in the volume particle size distribution) of, for example, 3 to 20 μm and preferably 5 to 15 μm from the viewpoint of increasing the filling properties of the negative electrode active material particles in the negative electrode and suppressing a side reaction with the electrolyte.

In an embodiment of the present invention, sulfur-containing hard carbon is preferably used as the negative electrode active material. In the case where the hard carbon is used, the film containing sodium sulfide is easily formed on the surface of each of the negative electrode active material particles.

The film formed on the surface of each of the negative electrode active material particles contains sodium sulfide. The sodium sulfide content of the negative electrode mixture layer may be estimated using the sulfur content of the negative electrode mixture layer as an index. The negative electrode mixture layer has a sulfur content of, for example, 0.05% by mass or more, preferably 0.1% by mass or more, and more preferably 0.4% by mass or more. The negative electrode mixture layer has a sulfur content of, for example, 10% by mass or less and preferably 5% by mass or less. These lower and upper limits may be freely combined. The sulfur content is represented by converting the amount of sulfur contained in 1 g of the negative electrode mixture layer into the molar amount of sulfur atoms regardless of what form the sulfur is contained in.

In the case where the sulfur content of the negative electrode mixture layer is within the range described above, the stable film containing sodium sulfide is easily formed. The formation of the appropriate film containing sodium sulfide is more effective in inhibiting an excessively increase in the resistance of the negative electrode while the decomposition of the molten salt electrolyte is inhibited. The sulfur content of the negative electrode mixture layer or the hard carbon may be determined by, for example, combustion infrared spectrometry.

In the hard carbon, sulfur is preferably contained in the form of a sulfur-containing functional group. The sulfur-containing group may be contained in the hard carbon in a state of being attached to the hard carbon. The sulfur-containing functional group may be contained in the hard carbon in a state of being not attached to the hard carbon (in other words, a component having the sulfur-containing group may be left in the hard carbon). The sulfur-containing functional group is not particularly limited. Examples thereof include a mercapto group (—SH), a thiocarbonyl group (>C=S), a thiocarboxyl group (—C(=O)—SH), and a dithiocarboxyl group (—C(=S)—SH). The hard carbon may contain one or two or more types of sulfur-containing functional group. The hard carbon preferably contains sulfur in the form of at least a mercapto group.

The sulfur content of the negative electrode mixture layer (or the hard carbon) may be adjusted by, for example, the use of a raw material having a high sulfur content for the hard carbon, or the production of the hard carbon under conditions in which sulfur is easily introduced (for example, in a sulfur-containing gas atmosphere). The hard carbon may be brought into contact with a sulfur-containing gas, such as hydrogen sulfide, to introduce the sulfur-containing functional group, such as a mercapto group, into the hard carbon, thereby adjusting the sulfur content of the negative electrode mixture layer (or the hard carbon).

The binder used in the negative electrode mixture layer serves to bond the active material particles together and fix the active material to the current collector. Examples of the binder include fluororesins, such as polytetrafluoroethylene, tetrafluoroethylene-hexafluoropropylene copolymers, and polyvinylidene fluoride; polyamide resins, such as aromatic polyamide; polyimide resins, such as polyimide (e.g., aromatic polyimide) and polyamide-imide; rubbery polymers, such as styrene rubber, e.g., styrene-butadiene rubber (SBR), and butadiene rubber; and cellulose derivatives (e.g., cellulose ethers), such as carboxymethylcellulose (CMC) and salts thereof (e.g., Na salts).

The amount of the binder is preferably 1 to 10 parts by mass and more preferably 3 to 5 parts by mass with respect to 100 parts by mass of the active material.

Examples of the conductive assistant include carbonaceous conductive assistants, such as carbon black and carbon fibers; and metal fibers. The amount of the conductive assistant may be appropriately selected from, for example, 0.1 to 15 parts by mass with respect to 100 parts by mass of the active material and may be in the range of 0.3 to 10 parts by mass.

In sodium ion secondary batteries including hard carbon serving as a negative electrode active material and organic electrolytic solutions, the organic electrolytic solutions are liable to be decomposed on surfaces of negative electrodes, thereby easily degrading the cycle characteristics. In such sodium ion secondary batteries, in order to inhibit the decomposition of the organic electrolytic solutions, fluorine-containing additives, such as fluoroethylene carbonate, are added to organic electrolytic solutions to form fluorine-containing films on surfaces of negative electrodes. However, even when such additives are used, it is difficult to markedly improve the cycle characteristics.

Although side reactions between negative electrode active materials and molten salt electrolytes occur also on surfaces of negative electrode active material particles or negative electrodes of sodium molten salt batteries, the degree of degradation in cycle characteristics is lower than that of the case where organic solvent-containing organic electrolytic solutions are used. In the case where metallic sodium is deposited on surfaces of negative electrodes, side reactions between deposited metallic sodium and molten salt electrolytes may cause degradation in cycle characteristics.

In an embodiment of the present invention, the film formed on the surface of each of the negative electrode active material particles contains sodium sulfide. The presence of the film inhibits the decomposition of the molten salt electrolyte on the surface of each of the negative electrode active material particles and the surface of the negative electrode, thereby significantly improving the cycle characteristics. The reason for this is not clear, but the volume of the sodium sulfide-containing film per mole of Na tends to be large, compared with fluorine-containing films; hence, a defect, such as a pinhole, is less likely to occur, so that the film is presumed to be stable. Thus, the presence of the film containing sodium sulfide is presumed to effectively inhibit the decomposition of the molten salt electrolyte.

The formation of sodium sulfide on the surface of each of the negative electrode active material particles is confirmed by, for example, measuring the binding energy of a Na—S bond by X-ray photoelectron spectroscopy (XPS).

The sodium sulfide may be formed by bonding Na to S of the sulfur-containing functional group in the hard carbon. The sodium sulfide may be contained in the film in the form of sodium sulfide that is not bonded to the hard carbon.

The film has an average thickness of, for example, 10 nm or more, preferably 20 nm or more, and more preferably 50 nm or more. The film has an average thickness of, for example, 500 nm or less, preferably 200 nm or less, and more preferably 150 nm or less or 100 nm or less. These lower and upper limits may be freely combined. The film may have an average thickness of, for example, 10 to 500 nm, 20 to 500 nm, or 50 to 500 nm. In the case where the average thickness of the film is within the range described above, it is possible to more effectively inhibit the decomposition of the molten salt electrolyte on the surface of each of the negative electrode active material particles and the surface of the negative electrode while an excessive increase in the resistance of the negative electrode is inhibited.

The thickness of the film may be measured by, for example, depth-profile analysis using Auger electron spectroscopy in combination with ion etching. The average thickness of the film may be calculated by measuring the thickness of the film at a plurality of freely selected positions (for example, 10 positions) on the negative electrode and averaging the resulting values. When the thickness of the film is measured, the analysis is preferably performed with a transfer vessel in such a manner that the film is not exposed to atmospheric air.

(Method for Producing Negative Electrode)

The negative electrode may be produced through a step A of forming a negative electrode mixture layer on a negative electrode current collector and a step of B of maintaining the negative electrode mixture layer formed on a surface of the negative electrode current collector in a predetermined molten salt electrolyte under predetermined conditions to form a film containing sodium sulfide.

(Step A)

In the step A, the negative electrode mixture layer may be formed by, for example, applying a negative electrode mixture paste containing negative electrode active material particles to a surface of the negative electrode current collector, drying the paste, and optionally rolling the paste.

The negative electrode mixture paste is prepared by dispersing the negative electrode active material particles and, as optional components, a binder and a conductive assistant in a dispersion medium. Examples of the dispersion medium include ketones, such as acetone; ethers, such as tetrahydrofuran; nitriles, such as acetonitrile; amides, such as dimethylacetamide; and N-methyl-2-pyrrolidone. These dispersion media may be used separately or in combination of two or more thereof.

The negative electrode active material particles used contain hard carbon serving as a negative electrode active material. As the hard carbon, sulfur-containing hard carbon may also be used.

As described above, the sulfur content of the hard carbon may be adjusted by, for example, using a raw material with a high sulfur content for the hard carbon, producing the hard carbon under conditions in which sulfur is easily introduced, or bringing the hard carbon into contact with a sulfur-containing gas (hydrogen sulfide or the like). Thus, the step A may include a substep a1 of bringing the hard carbon into contact with hydrogen sulfide to introduce sulfur into the hard carbon.

(Substep a1)

In the substep a1, the hard carbon (specifically, the negative electrode active material particles containing the hard carbon) may be exposed to hydrogen sulfide gas to increase the sulfur content of the hard carbon. As hydrogen sulfide, a gas containing hydrogen sulfide alone may be used, or a gas mixture of hydrogen sulfide and an inert gas (for example, argon gas) may be used.

For example, the substep a1 may be performed at atmospheric pressure or under pressure. The temperature in the substep a1 is not particularly limited and may be appropriately selected. The temperature in the substep a1 may be, for example, about 20° C. to about 40° C.

The hard carbon usually contains a functional group (an oxygen-containing group or the like), for example, a hydroxyl group, a carbonyl group, or a carboxyl group. Bringing the hard carbon into contact with hydrogen sulfide converts the functional group contained in the hard carbon into a sulfur-containing functional group (for example, the foregoing sulfur-containing functional group), such as a mercapto group. In the substep a1, the sulfur-containing functional group is introduced into the hard carbon, thereby increasing the sulfur content of the hard carbon. In this case, preferably, conditions, such as the concentration and the feed rate of hydrogen sulfide in a gas brought into contact with the hard carbon and the contact time with hydrogen sulfide, are appropriately adjusted in such a manner that the hard carbon has a sulfur content of 0.05% by mass or more.

Other than the substep a1, before the step B, a step C of introducing a mercapto group into the hard carbon may be performed to increase the sulfur content of the hard carbon.
(Step C)

In the step C, the negative electrode mixture layer obtained in the step A is brought into contact with hydrogen sulfide to introduce a mercapto group into the hard carbon.

In the step C, specifically, the negative electrode mixture layer obtained in the step A is exposed to hydrogen sulfide gas. As the hydrogen sulfide, a gas containing hydrogen sulfide alone may be used, or a gas mixture of hydrogen sulfide and an inert gas (for example, argon gas) may be used.

Also in the step C, the functional group, such as an oxygen-containing functional group, contained in the hard carbon in the negative electrode mixture layer is converted into a sulfur-containing functional group, such as a mercapto group, as in the case of the substep a1, thereby increasing the sulfur content of the hard carbon. In this case, preferably, conditions, such as the concentration and the feed rate of hydrogen sulfide in a gas brought into contact with the negative electrode mixture layer and the contact time with hydrogen sulfide, are appropriately adjusted in such a manner that the hard carbon has a sulfur content of 0.05% by mass or more. The conditions in the step C may be the same as, for example, the conditions in the substep a1.
(Step B)

In the step B, the negative electrode mixture layer formed on the surface of the negative electrode current collector is maintained in a molten salt electrolyte at least containing a first salt of a sodium ion (first cation) and bis(sulfonyl)amide anion (first anion) at 20° C. to 120° C. and a potential of 0.1 to 0.5 V for 10 to 60 minutes with respect to metallic sodium to form a film containing sodium sulfide on the surface of each of the negative electrode active material particles.

The temperature when the negative electrode mixture layer is maintained in the molten salt electrolyte may be appropriately selected, depending on the melting point of the molten salt electrolyte and the state of the film desired, and is 20° C. or higher, preferably 30° C. or higher, and more preferably 35° C. or higher. The temperature is 120° C. or lower, preferably 80° C. or lower, and more preferably 60° C. or lower or 45° C. or lower. These lower and upper limits may be freely combined. The temperature may be, for example, 30° C. to 80° C., 30° C. to 60° C., or 35° C. to 45° C. By maintaining the negative electrode mixture layer at the temperature, the stable film in which the formation of a defect, such as a pinhole, is inhibited is easily formed, and an excessively increase in the resistance of the film is easily inhibited.

In the step B, when the negative electrode mixture layer is maintained in the molten salt electrolyte, an electric potential is applied for a predetermined time. At this time, the electric potential is 0.1 to 0.5 V, preferably 0.2 to 0.45 V, and more preferably 0.2 to 0.4 V with respect to metallic sodium. The time to maintain the negative electrode mixture layer in the molten salt electrolyte under the application of the electric potential is 10 to 60 minutes, preferably 20 to 60 minutes, and more preferably 30 to 60 minutes. By maintaining the negative electrode mixture layer in the molten salt electrolyte under the conditions, it is possible to effectively form the film containing sodium sulfide on the surface of each of the negative electrode active material particles.
(Molten Salt Electrolyte)

The molten salt electrolyte in which the negative electrode mixture layer is maintained contains the foregoing first salt.
(a) First Salt Examples of the bis(sulfonyl)amide anion serving as the first anion contained in the first salt include a bis(fluorosulfonyl)amide anion [such as a bis(fluorosulfonyl)amide anion ($N(SO_2F)_2^-$)], a (fluorosulfonyl)(perfluoroalkylsulfonyl)amide anion [such as, a (fluorosulfonyl)(trifluoromethylsulfonyl)amide anion (($FSO_2$)($CF_3SO_2$)$N^-$), and a bis(perfluoroalkylsulfonyl)amide anion [such as, a bis(trifluoromethylsulfonyl)amide anion ($N(SO_2CF_3)_2^-$) or a bis(pentafluoroethylsulfonyl)amide anion ($N(SO_2C_2F_5)_2^-$)]. The number of carbon atoms of the perfluoroalkyl group is, for example, 1 to 10, preferably 1 to 8, more preferably 1 to 4, and particularly preferably 1, 2, or 3.

Examples of the first anion preferred include a bis(fluorosulfonyl)amide anion ($FSA^-$); a(fluorosulfonyl)(perfluoroalkylsulfonyl)amide anion such as a (fluorosulfonyl)(trifluoromethylsulfonyl)amide anion; and bis (perfluoroalkylsulfonyl)amide anions ($PFSA^-$), such as a bis(trifluoromethylsulfonyl)amide anion ($TFSA^-$) and a bis (pentafluoroethylsulfonyl)amide anion. As the first salt, for example, NaFSA or a salt (NaTFSA) of a sodium ion and $TFSA^-$ is particularly preferred. A single type of first salt may be used alone. Two or more types of first salts may be used in combination.
(b) Second Salt The molten salt electrolyte may contain a second salt of a cation (second cation) other than a sodium ion and an anion (second anion) in addition to the first salt. The incorporation of the second salt enables the melting point of the molten salt electrolyte to be reduced, so that the step B can be performed at a relatively low temperature. Furthermore, the stable film in which the formation of a defect, such as a pinhole, is inhibited is easily formed.

Examples of the second cation include inorganic cations other than a sodium ion and organic cations, such as organic onium cations.

Examples of the inorganic cations include metallic cations, such as alkali metal cations other than a sodium ion (e.g., a lithium ion, a potassium ion, a rubidium ion, and a cesium ion), and alkaline-earth metal cations (e.g., a magnesium ion and a calcium ion); and ammonium cations.

Examples of organic onium cations include cations derived from aliphatic amines, alicyclic amines, and aromatic amines (such as quaternary ammonium cations); nitrogen-containing onium cations, such as cations having nitrogen-containing heterocycles (i.e., cations derived from cyclic amines); sulfur-containing onium cations; and phosphorus-containing onium cations.

Examples of quaternary ammonium cations include tetraalkylammonium cations (e.g., tetra$C_{1-10}$alkylammonium cations), such as a tetramethylammonium cation, a tetraethylammonium cation ($TEA^+$), a hexyltrimethylammonium cation, an ethyltrimethylammonium cation, a methyltriethylammonium cation ($TEMA^+$).

Examples of sulfur-containing onium cations include tertiary sulfonium cations, such as trialkylsulfonium cations (for example, tri$C_{1-10}$alkylsulfonium cations), e.g., a trimethylsulfonium cation, a trihexylsulfonium cation, and a dibutylethylsulfonium cation.

Examples of phosphorus-containing onium cations include quaternary phosphonium cations, such as tetraalkylphosphonium cations (for example, tetraC$_{1-10}$alkylphosphonium cations), e.g., a tetramethylphosphonium cation, a tetramethylphosphonium cation, and a tetraoctylphosphonium cation; and alkyl(alkoxyalkyl)phosphonium cations (for example, triC$_{1-10}$alkyl(C$_{1-5}$alkoxyC$_{1-5}$alkyl)phosphonium cations), such as a triethyl(methoxymethyl)phosphonium cation, a diethylmethyl(methoxymethyl)phosphonium cation, and a trihexyl(methoxyethyl)phosphonium cation. In an alkyl(alkoxyalkyl)phosphonium cation, the total number of the alkyl groups and the alkoxyalkyl groups attached to a phosphorus atom is 4. The number of the alkoxyalkyl groups is preferably 1 or 2.

The number of carbon atoms of an alkyl group attached to the nitrogen atom of a quaternary ammonium cation, the sulfur atom of a tertiary sulfonium cation, or the phosphorus atom of a quaternary phosphonium cation is preferably 1 to 8, more preferably 1 to 4, and particularly preferably 1, 2, or 3.

Examples of the nitrogen-containing heterocyclic skeleton of an organic onium cation include 5- to 8-membered heterocycles, such as pyrrolidine, imidazoline, imidazole, pyridine, and piperidine, each having 1 or 2 nitrogen atoms serving as constituent atoms of the ring; and 5- to 8-membered heterocycles, such as morpholine, each having 1 or 2 nitrogen atoms and another heteroatom (an oxygen atom, a sulfur atom, or the like) serving as constituent atoms of the ring.

The nitrogen atom serving as a constituent atom of the ring may be attached to an organic group, such as an alkyl group, serving as a substituent. Examples of the alkyl group include alkyl groups, such as a methyl group, an ethyl group, a propyl group, and an isopropyl group, each having 1 to 10 carbon atoms. The number of carbon atoms of the alkyl group is preferably 1 to 8, more preferably 1 to 4, and particularly preferably 1, 2, or 3.

Among nitrogen-containing organic onium cations, in particular, a quaternary ammonium cation and a cation having pyrrolidine, pyridine, or imidazoline serving as a nitrogen-containing heterocyclic skeleton are preferred. In an organic onium cation having a pyrrolidine skeleton, two alkyl groups described above are preferably attached to one nitrogen atom included in the pyrrolidine ring. In an organic onium cation having a pyridine skeleton, one alkyl group described above is preferably attached to one nitrogen atom included in the pyridine ring. In an organic onium cation having an imidazoline skeleton, one alkyl group described above is preferably attached to each of the two nitrogen atoms included in the imidazoline ring.

Specific examples of the organic onium cation having a pyrrolidine skeleton include a 1,1-dimethylpyrrolidinium cation, a 1,1-diethylpyrrolidinium cation, a 1-ethyl-1-methylpyrrolidinium cation, a 1-methyl-1-propylpyrrolidinium cation (MPPY$^+$), a 1-butyl-1-methylpyrrolidinium cation (MBPY$^+$), and a 1-ethyl-1-propylpyrrolidinium cation. Of these, in particular, pyrrolidinium cations, such as MPPY$^+$ and MBPY$^+$, each having a methyl group and an alkyl group with 2 to 4 carbon atoms are preferred because of their high electrochemical stability.

Specific examples of the organic onium cation having a pyridine skeleton include 1-alkylpyridinium cations, such as a 1-methylpyridinium cation, a 1-ethylpyridinium cation, and a 1-propylpyridinium cation. Of these, pyridinium cations each having an alkyl group with 1 to 4 carbon atoms are preferred.

Specific examples of the organic onium cation having an imidazoline skeleton include a 1,3-dimethylimidazolium cation, a 1-ethyl-3-methylimidazolium cation (EMI$^+$), a 1-methyl-3-propylimidazolium cation, a 1-butyl-3-methylimidazolium cation (BMI$^+$), a 1-ethyl-3-propylimidazolium cation, and a 1-butyl-3-ethylimidazolium cation. Of these, imidazolium cations, such as EMI$^+$ and BMI$^+$, each having a methyl group and an alkyl group with 2 to 4 carbon atoms are preferred.

As the second anion, a bis(sulfonyl)amide anion is preferred. The bis(sulfonyl)amide anion may be appropriately selected from the anions exemplified as the first anions.

Specific examples of the second salt include a salt of a potassium ion and FSA$^-$ (KFSA), a salt of potassium ion and TFSA$^-$ (KTFSA), a salt of MPPY$^+$ and FSA$^-$ (MPPYFSA), a salt of MPPY$^+$ and TFSA$^-$ (MPPYTFSA), a salt of EMI$^+$ and FSA$^-$ (EMIFSA), and a salt of EMI$^+$ and TFSA$^-$ (EMITFSA). A single type of second salt may be used alone. Two or more types of second salts may be used in combination. Even in the case where the second cation included in the second salt contains an organic cation, it is possible to effectively inhibit the decomposition of the organic cation on the surface of each of the negative electrode active material particles or the negative electrode because the film containing sodium sulfide is formed on the surface of each of the negative electrode active material particles.

The molar ratio of the first salt to the second salt (=first salt:second salt) may be appropriately selected from the ranges of, for example, 1:99 to 99:1 and preferably 5:95 to 95:5, depending on types of salts. In the case where the second salt is a salt, such as a potassium salt, of an inorganic cation and the second anion, the molar ratio of the first salt to the second salt may be selected from the ranges of, for example, 30:70 to 70:30 and preferably 35:65 to 65:35. In the case where the second salt is a salt of an organic cation and the second anion, the molar ratio of the first salt to the second salt may be selected from the ranges of, for example, 1:99 to 60:40 and preferably 5:95 to 50:50.

(Additive)

The molten salt electrolyte may further contain an additive used to easily form the film containing sodium sulfide. Examples of the additive include sulfur-containing compounds each having a reduction potential higher than that of an anion contained in the molten salt. Examples of such sulfur-containing compounds include organic sulfonic acids. Examples of organic sulfonic acids include alkanesulfonic acids, such as methanesulfonic acid and ethanesulfonic acid; and arenesulfonic acids (e.g., C$_{6-12}$arenesulfonic acids), such as benzenesulfonic acid. These organic sulfonic acids may be used alone or in combination of two or more.

Among organic sulfonic acids, in particular, an alkanesulfonic acid is preferred. As the alkanesulfonic acid, a C$_{1-6}$alkanesulfonic acid is preferred, a C$_{1-4}$alkanesulfonic acid is more preferred, and a C$_{1-3}$alkanesulfonic acid, such as methanesulfonic acid, is particularly preferred. The alkanesulfonic acid preferably contains methanesulfonic acid. Methanesulfonic acid and another organic sulfonic acid (for example, a C$_{2-6}$alkanesulfonic acid, such as ethanesulfonic acid, or an arenesulfonic acid) may be used in combination.

The use of the additive enables the film containing sodium sulfide to be more effectively formed on the surface of each of the negative electrode active material particles.

The additive content of the molten salt electrolyte is, for example, 0.5% to 10% by mass. In the case where the additive content is within the range described above, the formability and the thickness of the film are easily adjusted. This is advantageous in that the stable film in which the formation of a defect is inhibited is formed. In the case of high-rate charging and discharging, the additive content of the molten salt electrolyte is preferably 8% by mass or less (for example, 1% to 8% by mass) and more preferably 7.5% by mass or less (for example, 2% to 7.5% by mass) from the viewpoint of easily inhibiting an increase in the resistance of the negative electrode and easily increasing the availability of the active material.

Sodium sulfide is decomposed by contact with water, molecular oxygen, carbon dioxide, or a halide ion (a chloride ion, a bromide ion, or the like). It is preferable to avoid contact with these components. Thus, the contents of these components (impurities) in the molten salt electrolyte are preferably minimized. For example, the water content of the molten salt electrolyte is preferably 100 ppm or less and more preferably 50 ppm or less.

The step B may be performed before the assembly of a sodium molten salt battery. Preferably, after the sodium molten salt battery is assembled, the step B is performed in the battery. In this case, the molten salt electrolyte of the sodium molten salt battery is used to form a film in the step B.

(Sodium Molten Salt Battery)

A sodium molten salt battery includes the negative electrode, a positive electrode, a separator arranged between the positive electrode and the negative electrode, and a molten salt electrolyte having sodium ion conductivity.

The molten salt electrolyte contains at least sodium ions serving as carrier ions. The molten salt electrolyte may be appropriately selected from the electrolytes exemplified in the section Step B.

The electrolyte melts at a temperature equal to or higher than the melting point into an ionic liquid that exhibits sodium ion conductivity, thereby operating the molten salt battery. To operate the battery at an appropriate temperature in view of cost and its usage environment, the electrolyte preferably has a lower melting point. To reduce the melting point of the electrolyte, a mixture of the first salt and the second salt as described above is preferably used as the electrolyte. Even in the case where the molten salt electrolyte contains the organic cation described above, it is possible to effectively inhibit the decomposition of the molten salt electrolyte on the surface of each of the negative electrode active material particles or the negative electrode because the film containing sodium sulfide is formed on the surface of each of the negative electrode active material particles.

The electrolyte used in the sodium molten salt battery may contain a known additive in addition to the foregoing sulfur-containing compound, as needed. Most of the electrolyte is preferably composed of the foregoing molten salts (the first salt and the second salt). The electrolyte has a molten salt content of, for example, 80% by mass or more (e.g., 80% to 100% by mass), preferably 85% by mass or more (e.g., 85% to 100% by mass), and more preferably 90% by mass or more (e.g., 90% to 100% by mass). In the case where the molten salt content is within the ranges described above, the heat resistance and/or flame retardancy of the electrolyte is easily enhanced.

(Positive Electrode)

As the positive electrode, for example, a positive electrode that electrochemically occludes and releases sodium ions is used.

The positive electrode includes a positive electrode current collector and a positive electrode active material fixed on the positive electrode current collector and may include, for example, a binder and a conductive assistant, as optional components.

As with the negative electrode current collector, metal foil, a nonwoven fabric composed of metal fibers, a porous metal sheet, or the like is used as the positive electrode current collector. Examples of a metal preferably contained in the positive electrode current collector include, but are not limited to, aluminum and aluminum alloys because they are stable at a positive electrode potential. The thickness of the current collector may be selected from the same range as used for the negative electrode current collector.

As a positive electrode active material, a compound containing sodium and a transition metal (transition metals, such as Cr, Mn, Fe, Co, and Ni, in the fourth period of the periodic table) is preferably used in view of thermal stability and electrochemical stability. The compound may contain one or two or more transition metals. At least one of sodium and the transition metal may be partially replaced with a main-group metal element, such as Al.

The positive electrode active material preferably contains a transition metal compound, such as a sodium-containing transition metal compound. The transition metal compound is not particularly limited and is preferably a compound having a layer structure in which sodium is inserted into and released from interlayer portions.

Among the transition metal compounds, examples of sulfides include transition metal sulfides, such as $TiS_2$ and $FeS_2$; sodium-containing transition metal sulfides, such as $NaTiS_2$. Examples of oxides include sodium-containing transition metal oxides, such as $NaCrO_2$, $NaNi_{0.5}Mn_{0.5}O_2$, $NaMn_{1.5}Ni_{0.5}O_4$, $NaFeO_2$, $NaFe_{x1}(Ni_{0.5}Mn_{0.5})_{1-x1}O_2$ ($0<x1<1$), $Na_{2/3}Fe_{1*3}Mn_{2/3}O_2$, $NaMnO_2$, $NaNiO_2$, $NaCoO_2$, and $Na_{0.44}MnO_2$. Examples of inorganic acid salts include sodium transition metal oxoates, such as sodium transition metal silicates (e.g., $Na_6Fe_2Si_{12}O_{30}$, $Na_2Fe_5Si_{12}O_{30}$, $Na_2Fe_2Si_6O_{18}$, $Na_2MnFeSi_6O_{18}$, and $Na_2FeSiO_6$), sodium transition metal phosphates, sodium transition metal fluorophosphates (e.g., $Na_2FePO_4F$ and $NaVPO_4F$), and sodium transition metal borates (e.g., $NaFeBO_4$ and $Na_3Fe_2(BO_4)_3$). Examples of sodium transition metal phosphates include $NaFePO_4$, $NaM^1PO_4$, $Na_3Fe_2(PO_4)_3$, $Na_2FeP_2O_7$, and $Na_4M^1_3(PO_4)_2P_2O_7$, wherein $M^1$ represents at least one selected from the group consisting of Ni, Co, and Mn. Examples of halides include sodium transition metal fluorides, such as $Na_3FeF_6$, $NaMnF_3$, and $Na_2MnF_6$.

These positive electrode active materials may be used alone or in combination of two or more.

Among the transition metal compounds, at least one selected from the group consisting of sodium-containing transition metal compounds, such as sodium chromite ($NaCrO_2$) and sodium iron manganese oxide ($Na_{2/3}Fe_{1/3}Mn_{2/3}O_2$) is preferred.

Cr or Na of sodium chromite may be partially replaced with another element. Fe, Mn, or Na of sodium iron manganese oxide may be partially replaced with another element. For example, $Na_{1-x2}M^2_{x2}Cr_{1-y1}M^3_{y1}O_2$ ($0 \le x2 \le 2/3$, $0 \le y1 \le 2/3$, and $M^2$ and $M^3$ each independently represent a metal element other than Cr or Na, and at least one selected from the group consisting of, for example, Ni, Co, Mn, Fe, and Al) and $Na_{2/3-x3}M^4_{x3}Fe_{1/3-y2}Mn_{2/3-z1}M^5y_{2+z1}O_2$ ($0 \le x3 \le 1/3$, $0 \le y2 \le 1/3$, $0 \le z1 \le 1/3$, and $M^4$ and $M^5$ each independently represent a metal element other than Fe, Mn, or Na, and at least one selected from the group consisting of, for example, Ni, Co, Al, and Cr) may be used, wherein $M^2$ and $M^4$ each represent an element that occupies Na sites, $M^3$ represents an element that occupies Cr sites, and $M^5$ represents an element that occupies Fe or Mn sites.

The binder and the conductive assistant may be appropriately selected from those exemplified for the negative electrode. The amounts of the binder and the conductive assistant with respect to the active material may also be appropriately selected from those exemplified for the negative electrode.

As with the case of the negative electrode mixture layer, the positive electrode mixture layer may be formed by applying a positive electrode mixture paste in which the positive electrode active material, the binder, and the conductive assistant are dispersed in a dispersion medium to a surface of the positive electrode current collector, drying the paste, and optionally rolling the paste. The dispersion medium may be appropriately selected from those exemplified for the negative electrode.

(Separator)

The separator serves to physically isolate the positive electrode from the negative electrode to prevent an internal short-circuit. The separator is composed of a porous material. The pores are filled with the electrolyte. To achieve a cell reaction, the separator has sodium ion permeability.

As the separator, for example, a microporous membrane composed of a resin or a nonwoven fabric may be used. The separator may be formed of the microporous membrane or a nonwoven fabric layer alone, or may be formed of a multilayer component having a plurality of layers with different compositions and shapes. Examples of the multilayer component include multilayer components each having a plurality of resin porous layers with different compositions; and multilayer components each having a microporous membrane and a nonwoven fabric layer.

The material of the separator may be selected in consideration of the operating temperature of a battery. Examples of a resin contained in fibers constituting the microporous membrane and the nonwoven fabric include polyolefin resins, such as polyethylene, polypropylene, and ethylene-propylene copolymers; polyphenylene sulfide resins, such as polyphenylene sulfide and polyphenylene sulfide ketone; polyamide resins, such as aromatic polyamide resins (e.g., aramid resins); and polyimide resins. These resins may be used alone or in combination of two or more. The fibers constituting the nonwoven fabric may be inorganic fibers, such as glass fibers. The separator is preferably composed of at least one selected from the group consisting of glass fibers, polyolefin resins, polyamide resins, and polyphenylene sulfide resins.

The separator may contain an inorganic filler. Examples of the inorganic filler include ceramics, such as silica, alumina, zeolite, and titania, talc, mica, and wollastonite. The inorganic filler is preferably in the form of particles or fibers. The separator has an inorganic filler content of, for example, 10% to 90% by mass and preferably 20% to 80% by mass.

The thickness of the separator is not particularly limited and may be selected in the range of, for example, about 10 to about 300 µm. In the case where the separator is formed of a microporous membrane, the separator preferably has a thickness of 10 to 100 µm and more preferably 20 to 50 µm. In the case where the separator is formed of a nonwoven fabric, the separator preferably has a thickness of 50 to 300 µm and more preferably 100 to 250 µm.

The sodium molten salt battery is used in a state in which the positive electrode, the negative electrode (or a negative electrode precursor), the separator arranged therebetween, and the molten salt electrolyte are housed in a battery case. The positive electrode and the negative electrode are stacked or wound with the separator provided therebetween to form an electrode group. The electrode group may be housed in the battery case. In the case where a battery case composed of a metal is used and where one of the positive electrode and the negative electrode is electrically connected to the battery case, part of the battery case may be used as a first external terminal. The remaining one of the positive electrode and the negative electrode is connected to a second external terminal leading to the outside of the battery case with a lead strip or the like in a state of being insulated from the battery case.

When the electrode group is formed, as the negative electrode, a negative electrode in which a film containing sodium sulfide is formed on the surface of each of the negative electrode active material particles contained in the negative electrode may be used. Alternatively, in the case where the electrode group is formed with a negative electrode in which no film containing sodium sulfide is formed on the surface of each of the negative electrode active material particles (that is, a negative electrode precursor), the negative electrode precursor may be converted into the negative electrode by maintaining the negative electrode precursor contained in the electrode group in the molten salt electrolyte under specific conditions to form the film containing sodium sulfide on the surface of each of the negative electrode active material particles.

FIG. 1 is a longitudinal sectional view schematically illustrating a molten salt battery. A sodium molten salt battery includes a stacked electrode group, an electrolyte (not illustrated), and a prismatic aluminum battery case 10 that accommodates these components. The battery case 10 includes a case main body 12 having an open top and a closed bottom; and a lid member 13 that closes the top opening.

When the sodium molten salt battery is assembled, positive electrodes 2 and negative electrodes 3 are stacked with separators 1 provided therebetween to form an electrode group, and the electrode group is inserted into the case main body 12 of the battery case 10. Then a step of filling gaps between the separators 1, the positive electrodes 2, and the negative electrodes 3 constituting the electrode group with an electrolyte is performed by charging a molten salt into the case main body 12. Alternatively, the electrode group may be impregnated with the molten salt, and then the electrode group containing the molten salt may be housed in the case main body 12. In addition, negative electrode precursors may be used in place of the negative electrodes 3, and then the negative electrode precursors may be converted into negative electrodes by maintaining the electrode group in a molten salt electrolyte under specific conditions.

A safety valve 16 configured to release a gas to be generated inside when the internal pressure of the battery case 10 increases is provided in the middle of the lid member 13. An external positive electrode terminal 14 passing through the lid member 13 in a state of being electrically connected to the battery case 10 is provided on one side portion of the lid member 13 with respect to the safety valve 16. An external negative electrode terminal passing through the lid member 13 in a state of being electrically insulated from the battery case 10 is provided on the other side portion of the lid member 13.

The stacked electrode group includes the plural positive electrodes 2, the plural negative electrodes 3, and the plural separators 1 provided therebetween, each of the positive electrodes 2 and the negative electrodes 3 having a rectangular sheet shape. In FIG. 1, each of the separators 1 has a bag shape so as to surround a corresponding one of the positive electrodes 2. However, the shape of each separator is not particularly limited. The plural positive electrodes 2 and the plural negative electrodes 3 are alternately stacked in the stacking direction in the electrode group.

A positive electrode lead strip 2a may be arranged on an end portion of each of the positive electrodes 2. The positive electrode lead strips 2a of the plural positive electrodes 2 are bundled and connected to the external positive electrode terminal 14 provided on the lid member 13 of the battery case 10, so that the plural positive electrodes 2 are connected in parallel. Similarly, a negative electrode lead strip 3a may be arranged on an end portion of each of the negative electrodes 3. The negative electrode lead strips 3a of the plural negative electrodes 3 are bundled and connected to the external negative electrode terminal provided on the lid member 13 of the battery case 10, so that the plural negative electrodes 3 are connected in parallel. The bundle of the positive electrode lead strips 2a and the bundle of the negative electrode lead strips 3a are preferably arranged on left and right sides of one end face of the electrode group with a distance kept between the bundles so as not to come into contact with each other.

Each of the external positive electrode terminal 14 and the external negative electrode terminal is columnar and has a spiral thread at least in the externally exposed portion. A nut 7 is engaged with the spiral thread of each terminal, and is screwed to secure the nut 7 to the lid member 13. A collar portion 8 is arranged in a portion of each terminal inside the battery case. Screwing the nut 7 allows the collar portion 8 to be secured to the inner surface of the lid member 13 with a washer 9.

APPENDIX

Regarding the foregoing embodiments, the following appendixes are further disclosed.

Appendix 1

A method for producing a negative electrode for a sodium molten salt battery includes a step A of forming a negative electrode mixture layer including negative electrode active material particles containing hard carbon on a surface of a negative electrode current collector; and a step of B of maintaining the negative electrode mixture layer formed on the surface of the negative electrode current collector in a molten salt electrolyte containing at least a first salt of a sodium ion serving as a first cation and a bis (sulfonyl)amide anion at 20° C. to 120° C. and a potential of 0.1 to 0.5 V for 10 to 60 minutes with respect to metallic sodium to form a film containing sodium sulfide on the surface of each of the negative electrode active material particles.

According to the production method, the film containing sodium sulfide is easily formed on the surface of each of the negative electrode active material particles. Thus, when a sodium molten salt battery is produced with the resulting negative electrode, the decomposition of the molten salt electrolyte is inhibited on the surface of each of the negative electrode active material particles or the negative electrode, thereby inhibiting degradation in cycle characteristics.

Appendix 2

In the method for producing a negative electrode for a sodium molten salt battery described in Appendix 1, the molten salt electrolyte preferably contains the first salt of a sodium ion serving as the first cation and a bis(sulfonyl) amide anion; and a second salt of a cation having a nitrogen-containing heterocycle, serving as a second cation, and a bis(sulfonyl)amide anion. The use of the molten salt electrolyte enables the film to be formed at a relatively low temperature (for example, 20° C. to 45° C. and preferably 35° C. to 45° C.), thus facilitating the formation of the stable film.

Appendix 3

In the method for producing a negative electrode for a sodium molten salt battery described in Appendix 1 or 2, the water content of the molten salt electrolyte is preferably 100 ppm or less. In the case where the water content of the molten salt electrolyte is within the range described above, it is possible to effectively inhibit the decomposition of sodium sulfide in the film formed on the surface of each of the negative electrode active material particles.

EXAMPLES

The present invention will be specifically described below on the basis of examples and comparative examples. However, the present invention is not limited to these examples described below.

Example 1

(1) Production of Positive Electrode

First, 90 parts by mass of $NaCrO_2$ (positive electrode active material), 5 parts by mass of acetylene black (electrically conductive agent), and 5 parts by mass of polyvinylidene fluoride (binder) were dispersed in N-methyl-2-pyrrolidone to prepare a positive electrode mixture paste. The resulting positive electrode mixture paste was applied to both surfaces of aluminum foil (10 cm long×10 cm wide×20 µm thick), sufficiently dried, and rolled to produce 10 positive electrodes each having an overall thickness of 150 µm, each of the positive electrodes having a positive electrode mixture layer on each surface thereof, and the positive electrode mixture layer having a thickness of 65 µm. A lead strip for current collection was formed on an end portion of a side of each of the positive electrodes.

(2) Production of Negative Electrode (Negative Electrode Precursor)

First, 100 parts by mass of hard carbon (negative electrode active material) and 5 parts by mass of polyvinylidene fluoride (binder) were dispersed in N-methyl-2-pyrrolidone to prepare a negative electrode mixture paste. The resulting negative electrode mixture paste was applied to both surfaces of aluminum foil (10 cm long×10 cm wide×20 µm thick) serving as a negative electrode current collector, sufficiently dried, and rolled to produce nine negative electrodes (or negative electrode precursors) each having an overall thickness of 100 µm, each of the negative electrodes having a negative electrode mixture layer on each surface thereof, the negative electrode mixture layer having a thickness of 40 µm. Two negative electrodes (or negative electrode precursors) were produced in the same way as described above, except that the negative electrode mixture layer was formed on only a surface of each of the negative electrode current collectors. A lead strip for current collection was formed on an end portion of a side of each of the negative electrodes.

(3) Assembly of Electrode Group

The positive electrodes and the negative electrodes (or the negative electrode precursors) were stacked in such a manner that the separators were provided between the positive electrodes and the negative electrodes (or the negative electrode precursors), the positive electrode lead strips were stacked together, the negative electrode lead strips were stacked together, and the bundle of the positive electrode lead strips and the bundle of the negative electrode lead strips were arranged in bilaterally symmetric positions, thereby producing an electrode group. Each of the negative electrodes each having the negative electrode mixture layer provided on only one side surface thereof was arranged at each of the end portions of the electrode group in such a manner that the negative electrode mixture layer faced the corresponding positive electrode. As the separator, a glass-fiber non-woven fabric (size: 10.6 cm×10.6 cm×200 μm thick) was used.

(4) Assembly of Molten Salt Battery

The electrode group produced in (3) and a molten salt electrolyte were housed in a case main body composed of aluminum. The opening of the case main body was sealed with a lid member (sealing plate) composed of aluminum to assemble a sodium molten salt battery having a nominal capacity of 2.5 Ah as illustrated in FIG. 1. As the molten salt electrolyte, a mixture of NaFSA and MPPYFSA in a molar ratio of 1:9 was used.

The positive electrodes, the negative electrodes, and the separators were vacuum-dried under heat in such a manner that the molten salt electrolyte in the battery had a water content of 100 ppm or less. In this case, the drying temperatures were 150° C. for the positive electrodes, 200° C. for the negative electrodes, and 90° C. for the separators. The preparation of the molten salt electrolyte and the assembly of the battery were performed in a dry room having a dew point of −50° C. or lower.

(5) Formation of Film

In the sodium molten salt battery produced in (4), constant-current discharge was performed to 3.1 V at a current rate of 0.1 C with the negative electrodes (that is, the negative electrode precursors) immersed in the molten salt electrolyte, and then constant-voltage charge was performed at 3.1 V for 30 minutes. In this case, the temperature of the molten salt electrolyte was 40° C. The negative electrode potential was 0.2 to 0.4 V with respect to metallic sodium.

The battery was disassembled. The XPS analysis of the component of the film formed on the surface of each of the negative electrode active material particles demonstrated that the film contained sodium sulfide.

In this way, the sodium molten salt battery (battery A1) was produced, in which in the negative electrodes, the film composed of sodium sulfide was formed on the surface of each of the negative electrode active material particles and had an average thickness of 100 nm.

(6) Evaluation

The sodium molten salt battery was heated to 60° C. Constant-current charge was performed at a current rate of 1 C to 3.3 V, and then constant-voltage charge was performed at 3.3 V. Discharge was performed at a current rate of 1 C to 1.5 V. At this time, the discharge capacity of the battery (initial discharge capacity, that is, discharge capacity at the first cycle) was measured. Furthermore, the foregoing charge-discharge cycle was repeated until the discharge capacity of the battery reached 80% of the initial discharge capacity. In this case, the number of charge-discharge cycles was determined and was used as an index of the cycle characteristics.

Comparative Example 1

A sodium molten salt battery (battery B1) was produced and evaluated as in Example 1, except that the step described in the section "(5) Formation of film" was not performed.

Table 1 lists the results of the example and the comparative example.

TABLE 1

| Battery | Number of cycle |
|---------|-----------------|
| A1      | 800             |
| B1      | 500             |

As listed in Table 1, in battery A1, the repetition of the charging and discharging was stably performed, compared with battery B1. The reason for this is presumably that in battery A1, the formation of the stable film on the surface of each of the negative electrode active material particles inhibited the decomposition of the molten salt electrolyte on the surface of each of the negative electrode active material particles. In contrast, in battery B1, it was presumed that the decomposition of the molten salt electrolyte was not sufficiently inhibited on the surface of each of the negative electrode active material particles.

Examples 2 to 4

Sodium molten salt batteries (batteries A2 to A4) were produced and evaluated as in Example 1, except that, for each battery, a molten salt electrolyte in which 2%, 5%, or 9% by mass of methanesulfonic acid was added to the mixture of NaFSA and MPPYFSA mixed in a molar ratio of 1:9 was used. Table 2 lists the results.

The batteries were disassembled. The XPS analysis of the components of the films formed on the surface of each of the negative electrode active material particles demonstrated that also in these examples, the films contained sodium sulfide.

TABLE 2

| Battery | Methanesulfonic acid (% by mass) | Number of cycle | Discharge availability at 1 C |
|---------|----------------------------------|-----------------|-------------------------------|
| A2      | 2                                | 1000            | 98%                           |
| A3      | 5                                | 1200            | 97%                           |
| A4      | 9                                | 1200            | 85%                           |

As listed in Table 2, also in the cases where the molten salt electrolytes containing methanesulfonic acid were used, high cycle characteristics were obtained as in Example 1.

Example 5

A sodium molten salt battery (battery A5) was produced and evaluated as in Example 1, except that the negative electrodes produced in the step (2) in the production of the negative electrodes (negative electrode precursors) of Example 1 were exposed to a hydrogen sulfide gas atmosphere (atmospheric pressure, 25° C.) for 30 minutes to introduce mercapto groups into the hard carbon and that the resulting negative electrodes in which the mercapto groups were introduced into the hard carbon were used for the assembly of the electrode group.

The battery was disassembled. The XPS analysis of the component of the film formed on the surface of each of the negative electrode active material particles demonstrated that the film contained sodium sulfide.

Example 6

A sodium molten salt battery (battery A6) was produced and evaluated as in Example 1, except that in the step (2) in the production of the negative electrodes (negative electrode precursors) of Example 1, 100 parts by mass of hard carbon (sulfur content: 0.5% by mass) was used as the negative electrode active material.

The battery was disassembled. The XPS analysis of the component of the film formed on the surface of each of the negative electrode active material particles demonstrated that the film contained sodium sulfide.

Table 3 lists the results of Examples 5 and 6.

TABLE 3

| Battery | Number of cycle |
|---------|-----------------|
| A5      | 1000            |
| A6      | 1000            |

As listed in Table 3, also in the case where the hard carbon having high sulfur content was used, high cycle characteristics were obtained. In batteries A5 and A6, higher cycle characteristics were obtained, even compared with battery A1.

INDUSTRIAL APPLICABILITY

According to an embodiment of the present invention, in the sodium molten salt battery, the decomposition of the molten salt electrolyte is inhibited on the surface of each of the negative electrode active material particles or the negative electrode, thereby inhibiting the degradation in cycle characteristics. Thus, the sodium molten salt battery is useful for, for example, large-scale power storage apparatuses for household and industrial use and power sources for electric vehicles and hybrid vehicles.

REFERENCE SIGNS LIST

1 separator
2 positive electrode
2a positive electrode lead strip
3 negative electrode
3a negative electrode lead strip
7 nut
8 collar portion
9 washer
10 battery case
12 case main body
13 lid member
14 external positive electrode terminal
16 safety valve

The invention claimed is:

1. A negative electrode for a sodium molten salt battery, comprising:
a negative electrode current collector and a negative electrode mixture layer arranged on a surface of the negative electrode current collector,
the negative electrode mixture layer including negative electrode active material particles and a film arranged on a surface of each of the negative electrode active material particles,
the negative electrode active material particles containing hard carbon, and
the film containing sodium sulfide.

2. The negative electrode for a sodium molten salt battery according to claim 1, wherein the film has an average thickness of 10 to 500 nm.

3. The negative electrode for a sodium molten salt battery according to claim 1,
wherein the hard carbon contains sulfur, and
the negative electrode mixture layer has a sulfur content of 0.05% by mass or more.

4. The negative electrode for a sodium molten salt battery according to claim 3, wherein the hard carbon contains a mercapto group.

5. A sodium molten salt battery comprising:
a positive electrode, the negative electrode according to claim 1, a separator arranged between the positive electrode and the negative electrode, and a molten salt electrolyte having sodium ion conductivity.

* * * * *